United States Patent [19]

Gruett

[11] Patent Number: 4,577,728
[45] Date of Patent: Mar. 25, 1986

[54] LUBRICANT METERING VALVE

[75] Inventor: Donald G. Gruett, Manitowoc, Wis.

[73] Assignee: Oil Rite Corporation, Manitowoc, Wis.

[21] Appl. No.: 678,359

[22] Filed: Dec. 5, 1984

Related U.S. Application Data

[63] Continuation of Ser. No. 489,258, Apr. 27, 1983, abandoned.

[51] Int. Cl.$^4$ .................. F16N 27/00; F15D 1/00
[52] U.S. Cl. ........................................ 184/7.4; 184/80
[58] Field of Search .................. 184/7.4, 58, 65, 80, 184/81, 83, 84, 87, 96; 138/41, 42, 43, 44, 45; 251/126

[56] References Cited

U.S. PATENT DOCUMENTS

| | | | |
|---|---|---|---|
| 2,175,881 | 10/1939 | Davis | 184/84 |
| 2,392,030 | 1/1946 | Davis | 251/126 |
| 4,062,424 | 12/1977 | Lyden | 184/65 |
| 4,106,525 | 8/1978 | Currie | 138/43 |

Primary Examiner—Leonard E. Smith
Assistant Examiner—Jane E. Obee
Attorney, Agent, or Firm—Andrus, Sceales, Starke & Sawall

[57] ABSTRACT

A metering valve for the drop feeding of a liquid lubricant includes a metering assembly disposed in a valve chamber having an inlet and an outlet. The metering assembly includes a cylindrical member having a peripherally disposed spiral groove. A sleeve is press fit on the cylindrical member to render the groove a closed spiral metering channel. The metering channel communicates with an outlet in the cylindrical member that is generally aligned with the chamber outlet. An O-ring seal surrounds the aligned outlets and is disposed between the floor of the chamber and the metering assembly to preclude passage of lubricant from the chamber except by passage through the metering assembly.

3 Claims, 6 Drawing Figures

LUBRICANT METERING VALVE

This is a continuation application of Ser. No. 489,258, filed Apr. 27, 1983, now abandoned.

BACKGROUND OF THE INVENTION

This invention relates to a metering valve for drop feeding of a liquid lubricant.

U.S. Pat Nos. 4,062,424 and 4,096,924, owned by the common assignee of the present invention, disclose metering valves for drop feeding of liquid lubricant at relatively slow feed rates, generally in the range from even less than 5 drops per minute up to about 15 drops per minute. While the porous rod metering valves of the patented construction were considered an improvement over the needle valves which due to silting become inconsistant and even erratic in a relatively short period of time, the porous rod valves, too, proved to be sensitive to impurities and additives in the lubricant and to changes in the formulation thereof. It is generally an object of this invention to provide a metering valve which will drop feed a liquid lubricant with substantial consistency over a reasonably long period of time.

SUMMARY OF THE INVENTION

Broadly, the metering valve of this invention for the drop feeding of a liquid lubricant comprises a valve body having a chamber. The valve chamber is provided with an inlet and an outlet with the latter disposed in the floor of the chamber. A metering assembly is disposed in the valve chamber and includes a cylindrical member having a peripherally disposed spiral groove. A sleeve is press fit on the cylindrical member to render the groove a closed spiral metering channel. The metering channel communicates with an outlet in the cylindrical member that is generally aligned with the chamber outlet. Sealing means are disposed in the valve chamber to preclude passage of lubricant from the chamber except by passage through the metering assembly.

DESCRIPTION OF THE DRAWING FIGURES

The drawings provided herewith illustrate the best mode presently contemplated for the invention and are described hereinafter.

DESCRIPTION OF THE ILLUSTRATED EMBODIMENTS

Figure 1:
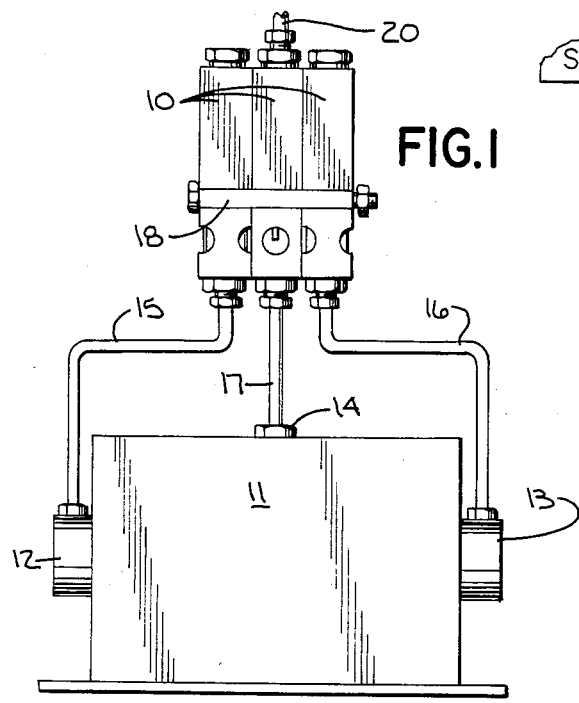
FIG. 1 shows in elevation a series of the metering valves of this invention gang mounted to lubricate select locations of a machine such as a vacuum pump.

Referring to the drawings, a plurality of metering valves 10 for drop feeding a liquid lubricant are shown gang mounted on or near a machine such as a vacuum pump 11. The vacuum pump 11 includes a plurality of lubrication points such as the end bearings 12 and 13 for a rotor, not shown, and at a location 14 intermediate the bearings for lubrication of the rotor lobes. The several lubrication points 12-14 individually communicate with a corresponding valve 10 through the tubing passages 15, 16 and 17 to provide the measure of lubricant required at each lubrication point.

Figure 2:
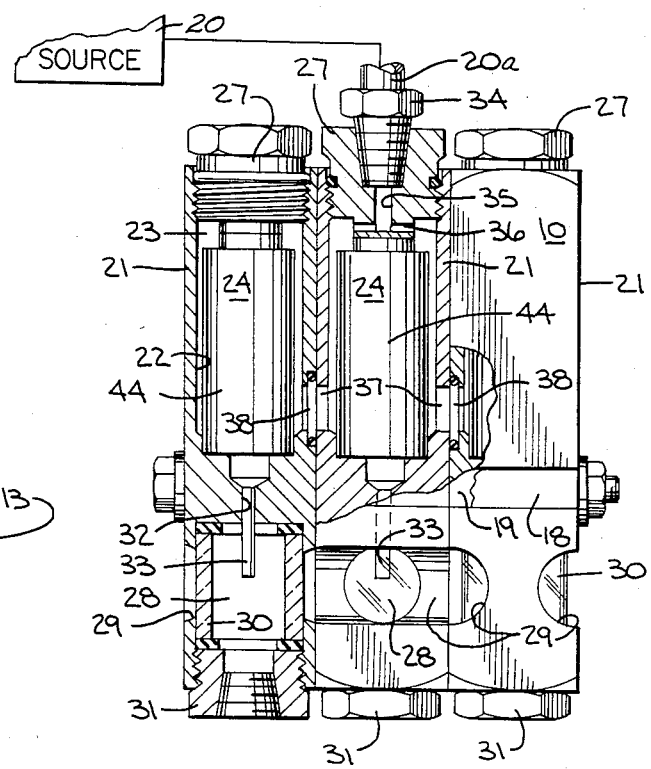
FIG. 2 is an enlarged elevational view partially in section showing details of the valves of FIG. 1.
Figure 3:
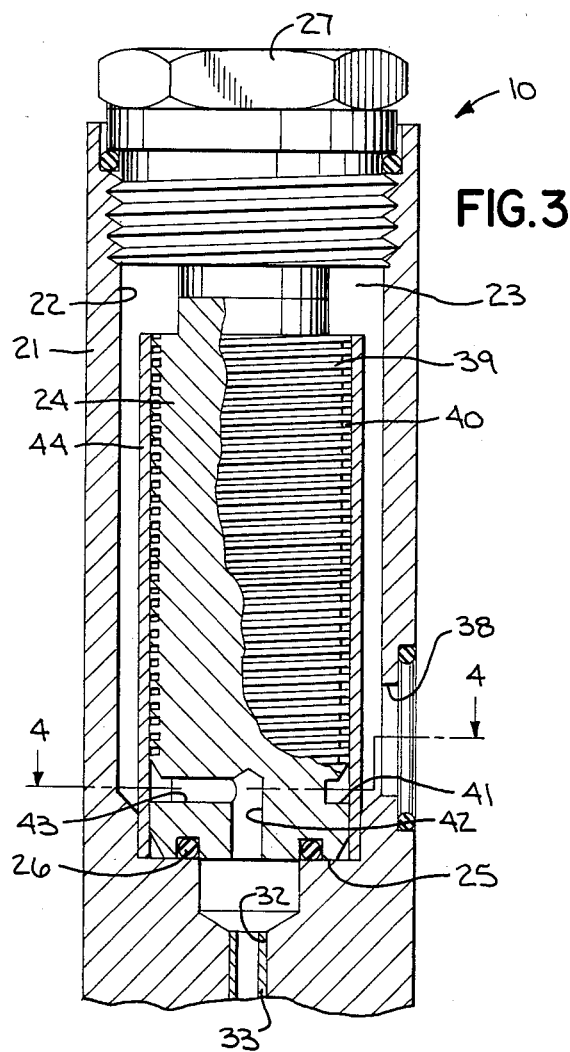
FIG. 3 is a further enlarged elevational view in section of the metering valve of this invention for the drop feeding of a liquid lubricant.
Figure 4:
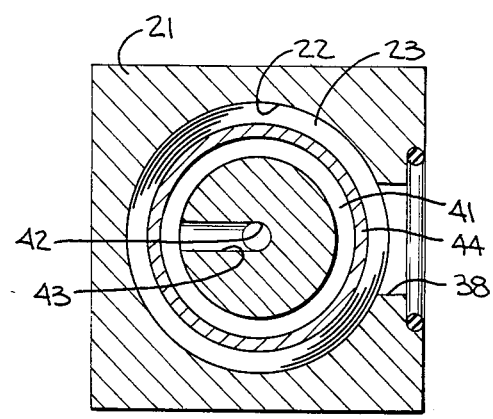
FIG. 4 is a sectional view taken generally on the line 4—4 of FIG. 3.

To provide an orderly appearance and simplify their mounting, the valves 10 are secured in their gang arrangement by one or more tie bars 18 which may be disposed in transversely aligned external recesses 19. The gang mounting arrangement further provides for the supply of the liquid lubricant to the valves 10 from a single, source 20 through the tubing passage 20a communicating with the valve disposed centrally of the gang arrangement, as generally shown in FIG. 2.

The valves 10 are generally similar in construction and comprise a generally rectangular body 21 as viewed in plan. Each valve 10 is provided with a vertically extending, stepped through bore 22. The enlarged portion of bore 22 opening upwardly forms a chamber 23 for receiving the cylindrical metering unit or assembly 24 which seats on the bore shoulder 25 providing a floor for the chamber and extends upwardly in spaced relation from the wall of the chamber. The bottom or base of the metering unit 24 is provided with a circular recess concentric with respect to the axis of the unit for seating the rubber O-ring seal 26 which engages upon the annular shoulder 25. The threaded upper closure plug 27 for the bore chamber 23 engages with the upper end of the metering unit 24 when in closure position to depress the O-ring seal 26 against the shoulder 25 to preclude flow of lubricant from the chamber to the corresponding lubrication points 12-14 except by passage through the metering unit.

The valves 10 further have an enlarged portion of bore 22 opening downwardly to provide for a sight chamber 28 to offer a visible check of valve performance. The valve body 21 is provided with transversely opposed sight openings 29 providing for viewing into the sight chamber 28. A length of transparent tubing 30 is coaxially and sealingly disposed in the lower bore portion and defines the chamber 28. A threadedly engaged hollow end cap 31 secures the transparent tubing 30 in place. The end cap 31 is adapted to receive an appropriate fitting for the tubing passage extending to the lubrication point.

Intermediate the upper chamber 23 and the lower sight chamber 28 the valve bore 22 necks down to a reduced bore portion 32 to provide a delivery outlet from the chamber 23. A nozzle 33 is press fit into the bore portion 32 and depends into the sight chamber 28 with the lower end of the nozzle in clear view through the sight openings 29.

In the gang mounting arrangement as best shown in FIG. 2, the liquid lubricant is supplied to the center valve 10 through the line 20 secured by appropriate fitting 34 in the upper closure plug 27. The closure plug 27 of the center valve 10 is provided with an axially extending passage 35 which communicates with the cross inlet passage 36 to direct the lubricant into the upper chamber 23 of that valve. Adjacent to the lower end of the chamber 23, body 21 of the center valve 10 is provided with diametrically opposed outlet openings 37 that are aligned with corresponding inlet openings 38 to the chambers 23 of the outer or adjacently disposed valves 10 to provide for a supply of the liquid lubricant to the outer valve units.

The metering unit 24 disposed in each valve 10 comprises a cylindrical member 39 provided with a peripherally disposed spiral groove 40 which extends from the upper end of the member and terminates in an enlarged circumferential groove 41 adjacent to the lower end of the member. The circumferential groove 41 communicates with an axially extending outlet passage 42 that opens downwardly of the member 39 by means of one or more radial passages 43. A sleeve 44 is press fit on the cylindrical member 39 and thus renders the grooves 40 and 41 closed passages or channels for metering a given amount of liquid lubricant for the corresponding lubrication point.

Since the sleeve 44 renders the grooves 40 and 41 closed passages, the lubricant to be metered must enter the metering unit 24 at its upper end. Thus, for continuous metering while the vacuum pump 11 is in operation, the liquid lubricant supply must provide for complete immersion of the metering units 24 in a bath of lubricant in the chambers 23. At least in the case of a vacuum pump 11, the magnitude of the vacuum being drawn will likely influence the metering rate of the unit 24. When the source of vacuum is removed, as when pump 11 is shut down, the valves 10 likely will continue to meter lubricant to the lubrication points by gravity feed but at a far lesser rate. Such afterdrip accumulation, however, may in fact be advantageous to render a small quantity of lubricant available for start up. If afterdrip accumulation must be limited or is not desired, shut-off may be provided in the supply line 20 and/or lubrication lines 15, 16 and 17.

The metering rate of a given metering unit 24 will be dependent upon the length or pitch and the cross-section of the spiral groove 40. To accommodate a wide range of metered flow conditions, a selection of metering units 24 are made available with appropriate variations for the spiral groove 40. If the original selection of metering unit 24 proves to be faulty, as providing either too much or too little liquid lubricant or if conditions at the lubrication point are somehow altered, it will be a relatively simple matter to remove an existing metering unit 24 from a valve 10 and replace it with another offering the desired metering rate.

While a vacuum pump 11 imposes a vacuum condition on the metering valves 10, such valves can be used under gravity flow or even pressure flow conditions as well.

Figure 5:
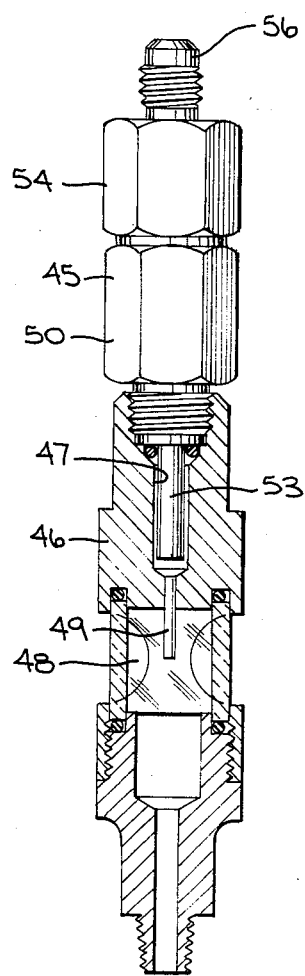
FIG. 5 is an elevational view of a further embodiment of the lubricant metering valve of this invention.
Figure 6:
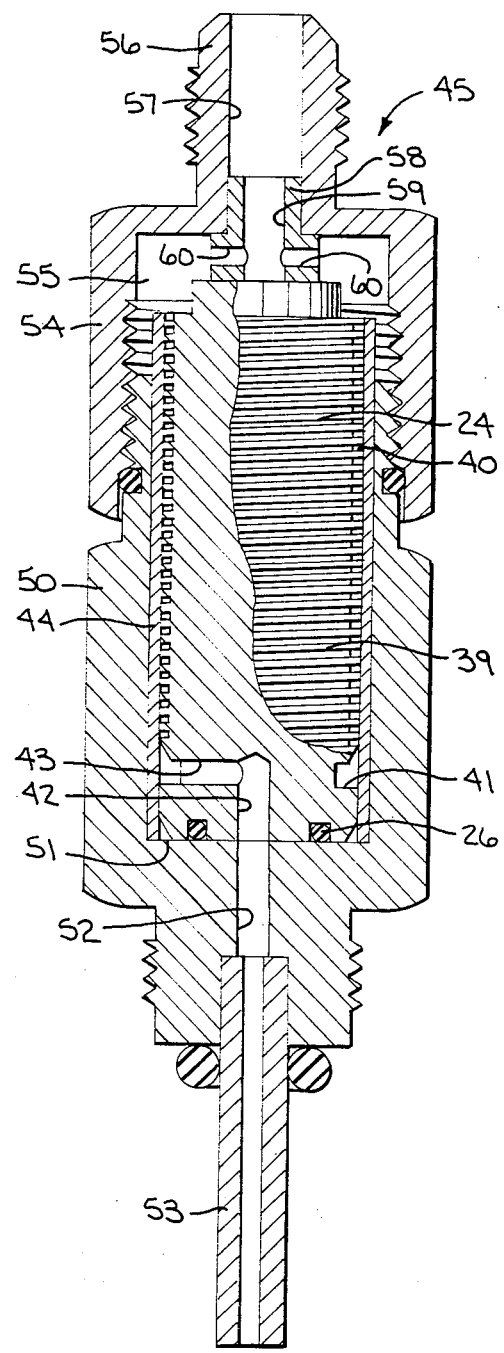
FIG. 6 is an enlarged elevational view in section of the valve of FIG. 5.

Metered lubricant flow has of course been available for vacuum pumps 11 and other machines for a substantial period of time. FIGS. 5 and 6 show how a metering valve 45 of the present invention may be adapted for use in a previously existing installation which included the valve portion 46. The valve portion 46 includes a stepped through bore 47 provided with a sight chamber 48 offering visual means for checking the lubricant flow from the nozzle 49 for delivery to a lubrication point.

The metering valve 45, as best shown in FIG. 6, includes a hollow body 50 for receiving a metering unit 24 therein. The metering unit 24 rests on the floor or shoulder 51 of the body 50 with the axial passage 42 of the metering unit being generally aligned with the stepped bore 52 that opens downwardly from the body. A length of tubing 53 is press fit into the lower end portion of the bore 52 and projects downwardly from the body. Exteriorly the lower end of the body 50 is stepped inwardly and threaded to engage within the upper end of the bore 47 of the valve portion 46 with the tubing 53 projecting into the bore 47 and generally aligned with the nozzle 49.

A closure cap 54 is threaded onto the body 50 to enclose the metering unit 24 within the chamber 55. The cap 54 includes an upwardly extending projection 56 for receiving a fitting as from a supply line, not shown. The axial bore 57 within the projection 56 opens into the chamber 55 and a spacer element 58 is press fit within the bore and projects into the chamber. The spacer element 58 is provided with an axial passage 59 and radial passages 60 to maintain flow communication between the bore 57 and chamber 55. The spacer element 58 engages upon the upper end of the metering unit 24 to sealingly depress the O-ring 26 against the floor 51 when the cap 54 is properly engaged onto the body 50 to thus preclude flow from the chamber 55 except by passage through the metering unit.

The metering valves 10 are capable of metering or drop feeding relatively small amounts of liquid lubricant rather precisely over a reasonably long period of time. If needed or desired, replacement of the metering assembly 24 within the valves 10 is a relatively simple matter and requires but little down time.

Various modes of carrying out the invention are contemplated as being within the scope of the following claims particularly pointing out and distinctly claiming the subject matter which is regarded as the invention.

I claim:

1. In a valve for metering a liquid lubricant from a source of lubricant to a lubrication point, a valve body having a stepped through bore forming a valve chamber, said chamber having an inlet and outlet, said inlet providing for receipt of the lubricant to fill the chamber with a bath of the lubricant and said outlet being formed by a radially reduced portion of the bore that provides a shoulder serving as the floor of the chamber, a metering assembly disposed in the chamber and immersed in the bath of lubricant, said metering assembly comprising a cylindrical member having a base and a peripherally disposed spiral groove, a sleeve press fit on said cylindrical member to render the groove a closed spiral metering channel having an inlet at the upper end of the member for receiving lubricant from the chamber, said channel commuicating with an outlet in the base of said cylindrical member generally aligned with the bore outlet from the chamber, an O-ring seal disposed between the base of the member and the floor of the chamber and circumferentially relative to the aligned outlets, and means to depress the cylindrical member and thereby the O-ring seal to generally preclude passage of lubricant from the chamber to the lubrication point except by passage through the metering assembly.

2. The structure as set forth in claim 1 wherein the valve chamber is adjacent to the upper end of the valve body and closure means are engaged on the upper end of the valve body, said closure means in its closure position being engageable with the upper end of the cylindrical member to depress the O-ring seal.

3. The structure as set forth in claim 1 wherein the metering rate of the assembly is established by the length and cross-section of the spiral metering channel, said assembly being replaceable by another assembly having a metering channel of different length and/or cross-section to provide a different metering rate when needed or desired.

* * * * *